(12) United States Patent
Fujitani et al.

(10) Patent No.: US 11,840,216 B2
(45) Date of Patent: Dec. 12, 2023

(54) PARKING ASSIST APPARATUS, PARKING ASSIST SYSTEM, AND PARKING ASSIST METHOD

(71) Applicant: Panasonic Intellectual Property Management Co., Ltd., Osaka (JP)

(72) Inventors: Kazui Fujitani, Tokyo (JP); Tomohiro Konuma, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 312 days.

(21) Appl. No.: 17/209,698

(22) Filed: Mar. 23, 2021

(65) Prior Publication Data
US 2021/0300337 A1 Sep. 30, 2021

(30) Foreign Application Priority Data

Mar. 24, 2020 (JP) .................................. 2020-052676

(51) Int. Cl.
*B60W 30/06* (2006.01)
*G08G 1/14* (2006.01)

(52) U.S. Cl.
CPC ............. *B60W 30/06* (2013.01); *G08G 1/141* (2013.01); *G08G 1/145* (2013.01); *B60W 2540/215* (2020.02); *B60W 2552/05* (2020.02); *B60W 2554/801* (2020.02); *B60W 2554/802* (2020.02)

(58) Field of Classification Search
CPC .......... B60W 30/06; B60W 2540/215; B60W 2552/05; B60W 2554/801; B60W 2554/802; B62D 15/028; B62D 15/0285; G08G 1/0962; G08G 1/09623; G08G 1/096716; G08G 1/096775; G08G 1/096791; G08G 1/141; G08G 1/143; G08G 1/144; G08G 1/145; G08G 1/146; G08G 1/147; G08G 1/168
See application file for complete search history.

(56) References Cited

U.S. PATENT DOCUMENTS

| 2016/0284217 | A1* | 9/2016 | Lee | B60D 1/30 |
| 2017/0148324 | A1* | 5/2017 | High | G08G 1/144 |
| 2018/0286240 | A1* | 10/2018 | Harai | G08G 1/14 |
| 2018/0301031 | A1* | 10/2018 | Naamani | G08G 1/148 |
| 2018/0308359 | A1* | 10/2018 | Hayakawa | B62D 15/0285 |

(Continued)

FOREIGN PATENT DOCUMENTS

JP 2017-065455 4/2017

*Primary Examiner* — Peter D Nolan
*Assistant Examiner* — Ce Li Li
(74) *Attorney, Agent, or Firm* — GREENBLUM & BERNSTEIN, P.L.C.

(57) ABSTRACT

A parking assist apparatus is provided. The parking assist apparatus includes: a parking space recognizer that recognizes a plurality of parking spaces in which a vehicle parks; a parking space candidate calculator that calculates one or more parking space candidates from among the plurality of parking spaces based on an evaluation criterion of a driver and information indicating a route of a moving object around the vehicle; a display controller that displays the one or more parking spaces on a display; and a driving controller that controls driving of the vehicle toward a parking space candidate selected from among the one or more parking space candidates.

19 Claims, 9 Drawing Sheets

(56) References Cited

U.S. PATENT DOCUMENTS

2020/0198623 A1* 6/2020 Günzel ............... B60W 30/095
2021/0179081 A1* 6/2021 Hara .................... B60W 10/20
2022/0148426 A1* 5/2022 Longardner ........... G08G 1/142

* cited by examiner

PARKING ASSIST APPARATUS, PARKING ASSIST SYSTEM, AND PARKING ASSIST METHOD

TECHNICAL FIELD

The present disclosure relates to a parking assist apparatus, a parking assist system, and a parking assist method.

BACKGROUND ART

Patent Literature (hereinafter, referred to as "PTL") 1 discloses a technique that enables calculation of an evaluation result based on an evaluation criterion of a driver for each of a plurality of parking spaces in a parking lot. The technique disclosed in PTL 1 displays, on a screen, a plurality of parking space candidates corresponding to the evaluation result based on the evaluation criterion of the driver, and the driver selects one parking space from the plurality of displayed parking space candidates, thereby calculating a parking route from a parking assist starting position to the parking space. As a result, a vehicle automatically parks along the calculated parking route.

CITATION LIST

Patent Literature

PTL 1
Japanese Patent Application Laid-Open No. 2017-065455

SUMMARY OF INVENTION

A parking assist apparatus according to one aspect of the present disclosure includes: a display controller that causes a display to display a first parking space candidate set including one or more parking spaces identified from among a plurality of parking spaces based on an evaluation criterion of a driver and information indicating states of movements of one or more moving objects around a first vehicle, and that causes the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed; and a driving controller that controls automatic driving of the first vehicle so that the first vehicle moves to a first parking space that is included in the first parking space candidate set and selected as the scheduled parking space.

A parking assist system according to one aspect of the present disclosure includes: a display controller that causes a display to display a first parking space candidate set including one or more parking spaces identified from among a plurality of parking spaces based on an evaluation criterion of a driver and information indicating states of movements of one or more moving objects around a first vehicle, and that causes the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed; and a driving controller that controls automatic driving of the first vehicle so that the first vehicle moves to a first parking space that is included in the first parking space candidate set and selected as the scheduled parking space.

A parking assist method according to one aspect of the present disclosure includes: causing a display to display a first parking space candidate set including one or more parking spaces identified from among a plurality of parking spaces based on an evaluation criterion of a driver and information indicating states of movements of one or more moving objects around a first vehicle, and causing the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed; and controlling automatic driving of the first vehicle so that the first vehicle moves to a first parking space that is included in the first parking space candidate set and selected as the scheduled parking space.

According to one aspect of the present disclosure, it is possible to construct a parking assist apparatus, a parking assist system, and a parking assist method that enable more appropriate parking space candidates depending on a movement of a moving object around a vehicle to be displayed.

Additional benefits and advantages of one aspect of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 9 is a diagram illustrating an example of a setting screen for setting an evaluation criterion and the like.

DESCRIPTION OF EMBODIMENTS

Embodiments of the present disclosure will be described in detail below with reference to the accompanying drawings. In the specification and drawings, components having substantially the same functionality are designated by the same reference sign, and duplicated description thereof will be omitted.

1. EMBODIMENT

Figure 1:
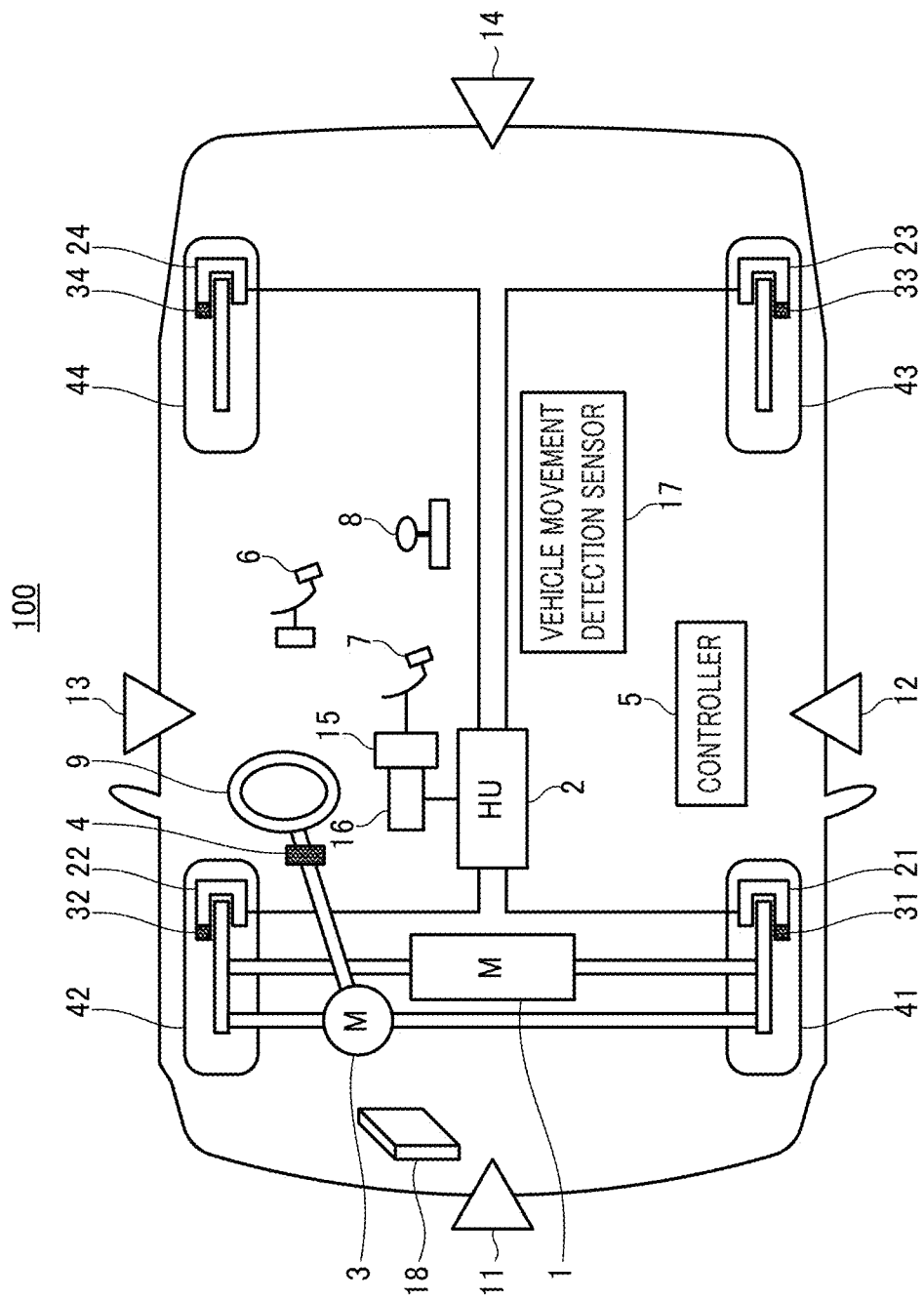
FIG. 1 is a diagram illustrating an exemplary configuration of a vehicle including a parking assist apparatus according to an embodiment of the present disclosure.

FIG. 1 is a diagram illustrating an exemplary configuration of vehicle 100 according to an embodiment of the present disclosure. Vehicle 100 is an example of a first vehicle according to the present disclosure. Vehicle 100 may be, for example, a passenger vehicle, a freight vehicle, an omnibus, or the like. Vehicle 100 includes parking assist apparatus 5A according to the embodiment. As illustrated in FIG. 1, vehicle 100 includes driving motor 1 that generates a driving force, a plurality of foil cylinders 21-24, and electro-hydraulic brake 2 that controls a hydraulic pressure of each of the plurality of foil cylinders 21-24. Vehicle 100 also includes electric power steering 3 that generates an assist torque corresponding to a steering torque and steers left and right front wheels 41 and 42, steering angle sensor 4, and controller 5. For example, controller 5 may be provided within parking assist apparatus 5A included in vehicle 100. Controller 5 is an example of a display controller, a driving controller, a parking space recognizer, an evaluation criterion setter, and a parking space candidate specifier according to the present disclosure, and it may realize functionality of these components.

Further, as illustrated in FIG. 1, vehicle 100 includes brake pedal 7, shift lever 8, steering wheel 9, brake booster 15 that amplifies a pedal force of brake pedal 7, master cylinder 16, vehicle movement detection sensor 17, and touch panel 18. Touch panel 18 is an example of a display according to the present disclosure. Additionally, vehicle 100 includes a plurality of wheel velocity sensors 31-34 that generate a plurality of wheel velocity pulses per rotation of a wheel, and a plurality of cameras 11-14 that capture objects around vehicle 100.

Each of the plurality of cameras 11-14 includes an imaging element such as a CCD (Charge Coupled Device) or a CMOS (Complementary Metal Oxide Semiconductor), and is an imaging means for imaging the outside of vehicle 100. The plurality of cameras 11-14 are mounted on the front, rear, left, and right sides of vehicle 100, respectively. An image captured by each of the plurality of cameras 11-14 is an example of information indicating states of movements of one or more moving objects according to the present disclosure. For example, controller 5 may identify the presence or absence of a moving object around vehicle 100, a state of a movement of the moving object, and the like by performing image analysis on an image captured by each of the plurality of cameras 11-14 (e.g., a moving image or a set of still images captured at a predetermined time interval). Further, images captured by the plurality of cameras 11-14 are displayed on touch panel 18 as a composite image in which vehicle 100 and surroundings around vehicle 100 are viewed downward from above. It should be noted that an image displayed on touch panel 18 is not limited to the image obtained by composing the images captured by the plurality of cameras 11-14, but may be, for example, an image obtained by composing images transmitted from an external device of the vehicle. It should be noted that vehicle 100 may include various types of sensors (e.g., an LiDAR (Light Detection And Ranging), a millimeter-wave radar, a far-infrared camera, an ultrasonic sonar, etc.) that are different from camera 11 in order to sense a moving object around vehicle 100. It should be noted that a sensing result sensed by at least one of the LiDAR, the millimeter-wave radar, the far-infrared camera, and the ultrasonic sonar is also an example of information indicating states of movements of one or more moving objects according to the present disclosure.

The external device may be, for example, a management server for managing one or more parking lots, a V2X (Vehicle to Everything) communication device, or the like. V2X is a communication technique that enables connecting vehicle 100 with various objects/things. V2X includes communications such as V2V (Vehicle to Vehicle), V2P (Vehicle to Pedestrian), V2I (Vehicle to Infrastructure), and V2N (Vehicle to Network). Vehicle 100 includes, for example, a DCM (Data Communication Module) in order to communicate with the external device. The DCM is a communication device that performs two-way communication with the management server or the like through a communication network. The communication network may include, for example, a cellular phone network, a satellite communication network, and/or the like. In addition, the DCM is connected to controller 5 so as to be able to communicate with each other through a CAN (Controller Area Network) which is an in-vehicle network, and can transmit various types of information to the external device of the vehicle in response to requests from controller 5.

Controller 5 performs various types of control processing relating to predetermined functionality in vehicle 100. Controller 5 may be configured to include one or more ECUs (Electronic Control Units) such as a motor ECU, a hybrid ECU, an engine ECU, and a cockpit ECU. Controller 5 may be configured to include only one ECU or a plurality of ECUs. It should be noted that a system in which each of the one or more ECUs that may be included in controller 5 is connected to the network in vehicle 100 is an example of a parking assist system according to the present disclosure.

Controller 5 may collect, for example, vehicle information and totally control vehicle 100. For example, when vehicle 100 is located in a spot (e.g., a parking lot) including a plurality of parking spaces where parking of vehicle 100 is allowed, controller 5 may recognize the plurality of parking spaces based on sensing results by various sensors (e.g., cameras 11-14, etc.) mounted on vehicle 100. Further, controller 5 may set an evaluation criterion of a driver. Then, controller 5 may specify a first parking space candidate set including one or more parking spaces from among the plurality of parking spaces based on the evaluation criterion of the driver and information indicating one or more states of one or more movements of one or more moving objects around vehicle 100. Then, controller 5 may cause touch panel 18 to display the first parking space candidate set in a manner that allows the driver to select any of all the parking spaces included in the first parking space candidate set as a scheduled parking space for vehicle 100. For example, controller 5 may further cause touch panel 18 to display, for each of all the parking spaces included in the first parking space candidate set, evaluation information such as an evaluation value specified for the parking space based on the evaluation criterion of the driver and the information indicating the states of the movements of the one or more moving objects in association with the parking space.

It should be noted that an example of the manner that allows the driver to select any of all the parking spaces is to cause touch panel 18 to display a predetermined GUI (Graphical User Interface) for causing the driver to select any of all the parking spaces as the scheduled parking space for vehicle 100 in association with the first parking space candidate set. Here, the predetermined GUI and the first parking space candidate set may be displayed in the same display screen. Alternatively, a screen including the predetermined GUI may be different from a screen including the first parking space candidate set, and touch panel 18 may be configured so that the driver can switch display between these two screens using, for example, a tab button, a menu button, and/or the like on touch panel 18. It should be noted that the predetermined GUI may be a predetermined window that can be displayed on touch panel 18. Further, the predetermined GUI may include one or more icons, software buttons, software keys, and/or the like that can be operated by the driver via, for example, a touch operation or the like.

Further, controller 5 may control automatic driving of vehicle 100. For example, when one parking space is selected as the scheduled parking space for vehicle 100 by the driver, controller 5 may control the automatic driving of vehicle 100 so that vehicle 100 moves to the selected parking space. In addition, when predetermined instruction information for moving vehicle 100 is inputted based on, for example, an operation of the driver or the like after vehicle 100 parks in any of the plurality of parking spaces, controller 5 may be capable of controlling the automatic driving of vehicle 100 so that vehicle 100 exits the parking space based on the evaluation criterion of the driver.

The functionality of controller 5 will be described in more detail below. The above-described vehicle information may include, for example, vehicle position information, velocity information, vehicle state information, imaging information, and/or the like. The vehicle position information may be information indicating a current position of the vehicle, for example, information indicating the latitude and longitude in which driving vehicle 100 is located. The vehicle position information may be transmitted from, for example, a vehicle navigation system, a GPS (Global Positioning System) module, or the like. The velocity information may be information indicating a current velocity of vehicle 100 transmitted from a vehicle velocity sensor. The vehicle state information may include, for example, a signal indicating whether an ACC (Auto Crouse Control) switch is in an ON state or in an OFF state. Additionally or alternatively, the vehicle state information may include an operating state of a wiper, a state of a defogger, an accelerator opening, a brake depression amount, a steering amount of the steering, information obtained from ADAS (Advanced Driver-Assistance Systems), and/or the like. The ADAS is a system that assists driving operations of the driver in order to enhance the convenience of road traffic. The imaging information may be information indicating a content of an image captured by each of the plurality of cameras 11-14.

Controller 5 switches a mode of vehicle 100 to a parking space recognition mode when the driver operates an automatic parking mode start button displayed on touch panel 18 for example in a parking lot. In the parking space recognition mode, one or more parking space candidates corresponding to the evaluation criterion of the driver are displayed on touch panel 18. Specifically, when the driver drives vehicle 100 to the vicinity of any parking space, from among one or more parking spaces (parking frames) recognized based on images captured by the plurality of cameras 11-14, the parking space candidates are displayed on touch panel 18.

The evaluation criterion of the driver represents a selection criterion for selecting a parking space when the parking space is presented to the driver as a parking space candidate from among one or more parking spaces. It should be noted that data indicating the evaluation criterion of the driver may be stored in a storage device (not illustrated) in vehicle 100. Hereinafter, the evaluation criterion of the driver may be simply referred to as an evaluation criterion.

The evaluation criterion may include, for example, one or more evaluation items such as a required parking time (hereinafter, referred to as a parking time), the number of switches between steering to the right and steering to the left allowed by the driver when parking or exiting, the number of switches between forward driving and backward driving allowed by the driver when parking or exiting, a distance from a parking lot entrance to a parking space, and a direction of parking. The evaluation criterion may further include a predetermined coefficient (in other words, a predetermined weight) for each of these evaluation items. A specific content of each of these evaluation items will be described later. These evaluation criteria may be set via screen input to touch panel 18 by the driver.

The parking time is a time required for vehicle 100 to mover from the parking assist starting position to the parking space (e.g., the center position of the parking frame).

The number of switches between forward driving and backward driving is the number of times that a traveling direction of vehicle 100 is switched from forward to backward and from backward to forward since a time when the parking assist is started until a time when vehicle 100 completes parking. For example, in the case of backward parking, the number of switches between forward driving and backward driving is zero if vehicle 100 parks driving only backward, and the number of switches between forward driving and backward driving is one if vehicle 100 parks after the traveling direction of vehicle 100 is switched from forward to backward. Further, in the case of backward parking, the number of switches between forward driving and backward driving is three if the traveling direction of vehicle 100 is switched in the order of from forward to backward, from backward to forward, and from forward to backward.

It should be noted that the evaluation criterion may be any criterion as long as it can assist the parking of the driver, and is not limited to the above criteria. Details of a method of setting the evaluation criterion will be described later.

When the driver touches one of the displayed parking space candidates, the parking space is selected. When the driver touches, in this state, a parking start button displayed on touch panel 18, the mode of vehicle 100 transitions from the parking space recognition mode to an automatic parking mode. Accordingly, controller 5 controls driving motor 1, electro-hydraulic brake 2, electric power steering 3, and the like so that vehicle 100 reaches the parking space. That is, controller 5 controls the automatic driving of vehicle 100 so that vehicle 100 moves to the corresponding parking space.

It should be noted that although operations of vehicle 100 during the automatic parking mode are automatically controlled by driving motor 1, electro-hydraulic brake 2, and electric power steering 3, it is possible to cause the manual operation of the driver to override the automatic control since the operation amount of the driver is monitored. For example, when the driver operates brake pedal 7 during the automatic parking mode, controller 5 causes vehicle 100 to be paused, and resumes the parking operation according to the automatic control after the driver releases the brake. In this way, when another moving object (e.g., a pedestrian, a bicycle, etc.) enters into a parking route, the driver's brake operation overrides the automatic control, thereby it is possible to avoid contact with the other moving object. Thereafter, when the operation of brake pedal 7 is released, the parking operation according to the automatic control is resumed. In this way, the parking assist can be resumed automatically when the obstacle leaves the parking route. Further, when the driver changes a shift position or the driver's steering torque becomes larger than or equal to a predetermined value, the parking operation according to the automatic control is stopped. In this way, vehicle 100 can be driven so that the driver's shifting operation or steering operation override the automatic control.

(Exemplary Configuration of Parking Assist Apparatus 5A)

Figure 2:
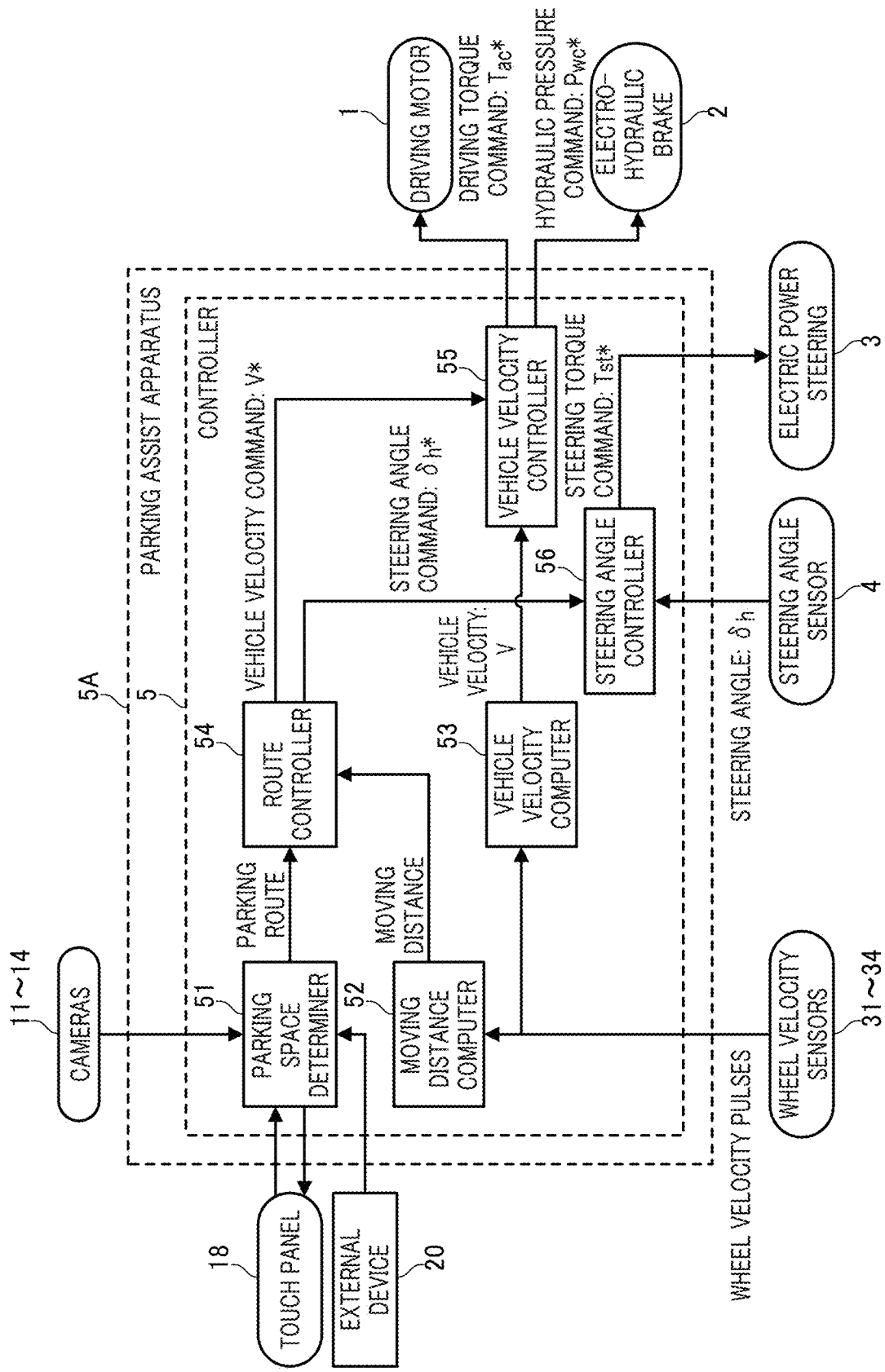
FIG. 2 is a diagram illustrating an exemplary configuration of functionality of an ECU (Electronic Control Unit)

Here, an exemplary configuration of controller 5 will be described with reference to FIG. 2. FIG. 2 is a block diagram illustrating an exemplary configuration of controller 5. As illustrated in FIG. 2, controller 5 includes parking space determiner 51, moving distance computer 52, vehicle velocity computer 53, route controller 54, vehicle velocity controller 55, and steering angle controller 56. Here, parking space determiner 51 is an example of a parking space recognizer, an evaluation criterion setter, a parking space candidate identifier, and a display controller according to the present disclosure. Further, moving distance computer 52, vehicle velocity computer 53, route controller 54, vehicle velocity controller 55, and steering angle controller 56 are an example of a driving controller according to the present disclosure.

Parking space determiner 51 recognizes one or more parking spaces based on images captured by cameras 11-14, an image transmitted from the external device 20, and/or the like. Further, parking space determiner 51 causes one or more parking spaces corresponding to the evaluation criterion from among the one or more recognized parking spaces to be displayed as parking space candidates on the screen of touch panel 18. A parking space can be recognized by recognizing a white line, recognizing an empty space for one vehicle, and the like. In addition, when the driver selects a parking space candidate on a predetermined screen displayed on touch panel 18, parking space determiner 51 determines the selected parking space candidate as a parking space. Furthermore, parking space determiner 51 calculates a parking route for causing vehicle 100 to automatically park in the determined parking space, and inputs the parking route to route controller 54.

Moving distance computer 52 computes a moving distance of vehicle 100 by accumulating the number of times of generation of wheel velocity pulses generated by the plurality of wheel velocity sensors 31-34, and inputs the moving distance to route controller 54.

Vehicle velocity computer 53 computes a vehicle velocity V using a generation cycle of wheel velocity pulses generated by the plurality of wheel velocity sensors 31-34.

Route controller 54 determines a vehicle velocity command (target value of the vehicle velocity) V* and a steering angle command (target value of the steering angle) $\delta_h^*$ based on the parking route and the moving distance.

Vehicle velocity controller 55 performs vehicle velocity control based on the vehicle velocity command V* and the vehicle velocity V, and determines a driving torque command $T_{ac}^*$ to driving motor 1 and a hydraulic pressure command $P_{wc}^*$ to electro-hydraulic brake 2 as operation amounts.

Driving motor 1 and electro-hydraulic brake 2 generates a driving force and a braking force by these commands. That is, the automatic driving of vehicle 100 may be controlled by these commands. It should be noted that both the driving force and the braking force may be generated only by driving motor 1, or the driving force may be generated by driving motor 1 and the braking force may be generated by electro-hydraulic brake 2. If driving motor 1 is replaced with an engine, the latter may be adopted.

Based on the steering angle command delta $\delta_h^*$ and a steering angle $\delta_h$ measured by steering angle sensor 4, steering angle controller 56 performs steering angle control and determines a steering torque command $T_{st}^*$ as an operation amount. Electric power steering 3 generates a steering torque by this command. That is, the automatic driving of vehicle 100 may be controlled by this command.

Figure 3:
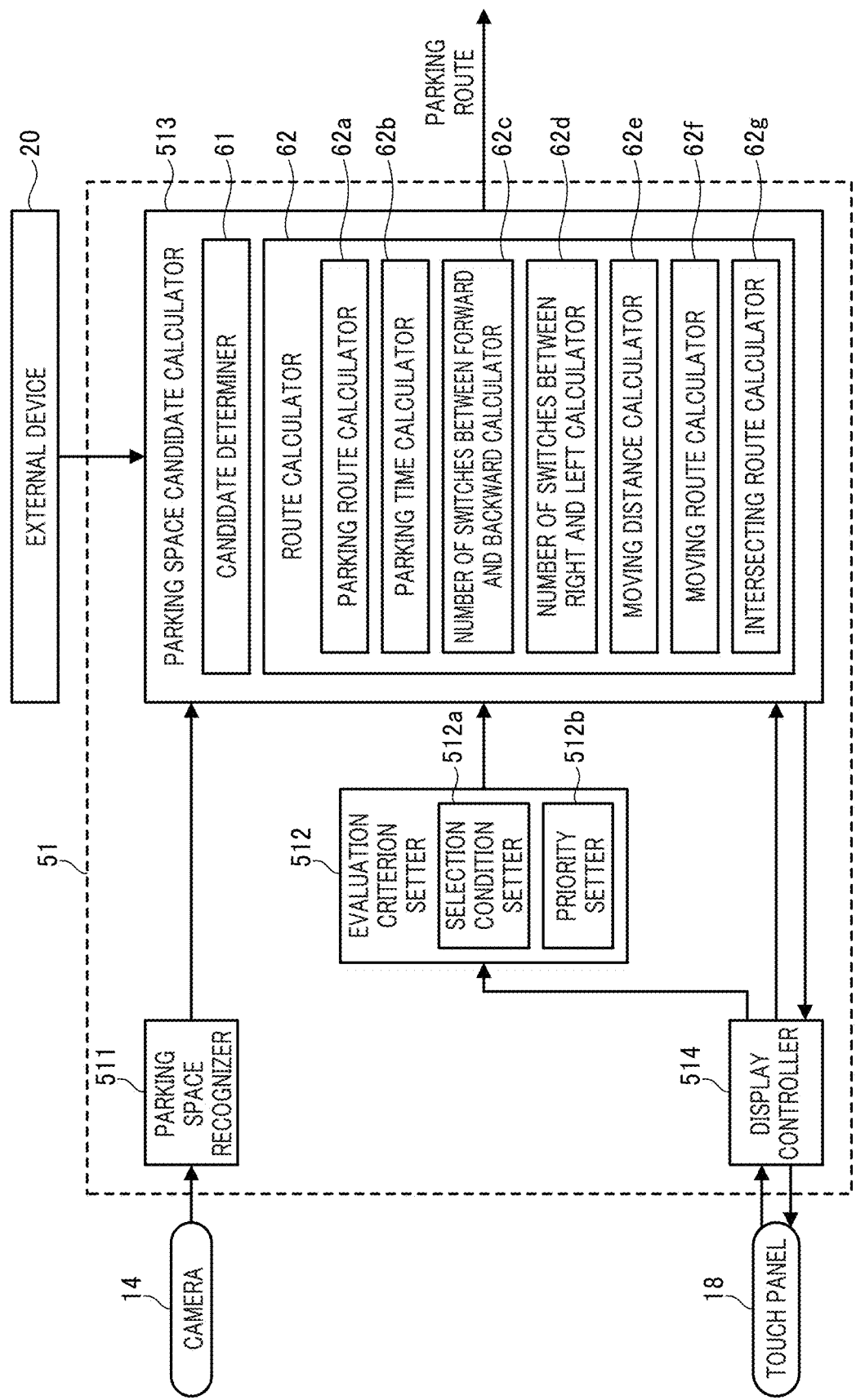
FIG. 3 is a diagram illustrating an exemplary configuration of functionality of a parking space determiner.

FIG. 3 is a diagram illustrating an exemplary configuration of parking space determiner 51. Parking space determiner 51 includes parking space recognizer 511, evaluation criterion setter 512, parking space candidate calculator 513, and display controller 514.

Parking space recognizer 511 may recognize one or more parking spaces based on, for example, sensing results by various sensors mounted on vehicle 100. For example, parking space recognizer 511 recognizes a plurality of parking spaces from images captured by cameras 11-14, and inputs information (coordinates, etc.) relating to the plurality of recognized parking spaces to parking space candidate calculator 513.

Evaluation criterion setter 512 may set the evaluation criterion of the driver described above. For example, evaluation criterion setter 512 sets a plurality of evaluation criteria among the plurality of parking spaces recognized by parking space recognizer 511. Setting of the evaluation criterion is performed via an operation of touch panel 18. A specific example of a setting screen for setting the evaluation criterion will be described later.

For example, evaluation criterion setter 512 includes selection condition setter 512a and priority setter 512b. Selection condition setter 512a sets a selection condition corresponding to a preference of the driver with respect to the evaluation criterion selected on touch panel 18. Setting of the selection condition is performed via an operation of touch panel 18. A specific example of a setting screen on touch panel 18 for setting the selection condition will be described later. The selection condition may include, for example, an upper limit of the parking time (10 seconds, 30 seconds, etc.), an upper limit of the number of switches between forward driving and backward driving (0, 5, etc.), an upper limit of the number of switches between steering to the right and steering to the left (1, 3, etc.), an upper limit of the distance from the parking lot entrance to the parking space (10 m, 50 m, etc.), and/or the like. When a selection condition is set via an operation of touch panel 18, selection condition setter 512a inputs information indicating a content of the set selection condition to parking space candidate calculator 513.

Priority setter 512b sets a priority (weighting) corresponding to a preference of the driver with respect to the selected evaluation criterion. Setting of the priority is performed via an operation of touch panel 18. A specific example of a setting screen on touch panel 18 for setting the priority will be described later. The priority is set with respect to, for example, each of the parking time, the number of switches between forward driving and backward driving, the number of switches between steering to the right and steering to the left, the distance from the parking lot entrance to the parking space, and the like with, for example, numerical values of six stages from "0" to "5." It should be noted that the priority is not limited to the numerical value, but may be a character representing weighting such as "A," "B," "C," or the like, or may be a notation that is easy for the driver to intuitively grasp, for example, "priority invalid," "priority low," "priority medium," "priority high," or the like. Since the evaluation value for the evaluation criterion desired by the driver may be relatively larger by setting the priority, it is easy to park in the parking space desired by the driver. When a priority is set via an operation of touch panel 18, priority setter 512b inputs information indicating a content of the set priority to parking space candidate calculator 513. Here, the evaluation value is an example of evaluation information according to the present disclosure.

Parking space candidate calculator 513 is an example of a parking space candidate identifier according to the present disclosure. Parking space candidate calculator 513 may specify a parking space candidate set where parking of a subject vehicle is allowed from among the plurality of parking spaces recognized by parking space recognizer 511, based on the evaluation criterion of the driver set by evaluation criterion setter 512 and the information indicating the states of the movements of the one or more moving objects around the subject vehicle. For example, parking space candidate calculator 513 includes candidate determiner 61 and route calculator 62. Candidate determiner 61 determines, as a parking space candidate, a parking space that satisfies a part or all of the selection conditions set by the selection condition setter 512a from among a plurality of parking spaces determined to be capable of automatic parking (capable of setting a parking route according to the automatic parking) in route calculator 62. Parking space candidate calculator 513 inputs information indicating a content of the determined parking space candidate to display controller 514.

Display controller 514 controls display on touch panel 18. For example, when the parking space candidate set is identified by parking space candidate calculator 513, display controller 514 causes touch panel 18 to display the parking space candidate set in a manner that allows the driver to select any of all the parking spaces included in the parking space candidate set as a scheduled parking space for vehicle 100. In an example, display controller 514 may further cause display panel 18 to display, for each of all the parking spaces included in the parking space candidate set, evaluation information such as an evaluation value specified for the parking space based on the evaluation criterion of the driver and the information indicating the states of the movements of the one or more moving objects in association with the parking space.

The functionality of display controller 514 will be described in more detail below. For example, display controller 514 displays the parking space candidate on touch panel 18 based on the input information, and prompts the driver to select a parking space. Accordingly, the driver can touch one parking space candidate from among a plurality of parking space candidates to select the parking space. It should be noted that the selected parking space is decorated (e.g., highlighted) differently from other parking spaces that are not selected. In this way, it is possible to clarify that the parking space has been selected.

Display controller 514 inputs information indicating the selected parking space to parking route calculator 62a. Further, display controller 514 displays the set content of the evaluation criterion on touch panel 18. When the driver updates the evaluation criterion by operating touch panel 18, the update content is set in selection condition setter 512a.

Route calculator 62 calculates a plurality of parking spaces where automatic parking of the vehicle is allowed from among the plurality of parking spaces recognized by parking space recognizer 511 considering the movements of the moving objects (vehicle, person, etc.) existing around the subject vehicle (vehicle 100), a moving route, and/or the like. The moving objects existing around the subject vehicle can be detected, for example, by using images captured by the plurality of cameras 11-14, vehicle information collected by the subject vehicle, information obtained from the external device 20, and/or the like. Here, the subject vehicle is an example of a first vehicle according to the present disclosure. Further, the images captured by the plurality of cameras 11-14, the vehicle information collected by the subject vehicle, the information obtained from the external device 20, and/or the like are an example of information indicating states of movements of one or more moving objects according to the present disclosure.

Also, route calculator 62 calculates a parking route for each of the plurality of parking spaces, a vehicle velocity command, and the like. Route calculator 62 includes parking route calculator 62a, parking time calculator 62b, number of switches between forward and backward calculator 62c, number of switches between right and left calculator 62d, moving distance calculator 62e, moving route calculator 62f, and intersecting route calculator 62g.

Based on the information indicating the selected parking space, parking route calculator 62a calculates a parking route from the parking assist starting position of the subject vehicle to the parking space, and inputs information indicating a content of the parking route to route controller 54 illustrated in FIG. 2.

Parking time calculator 62b calculates a parking time of the subject vehicle for each of the plurality of parking space candidates determined by candidate determiner 61.

For each of the plurality of parking space candidates determined by candidate determiner 61, number of switches between forward and backward calculator 62c calculates the number of switches between forward driving and backward driving when the subject vehicle moves along the parking route from the parking assist starting position to the parking space.

Number of switches between right and left calculator 62d calculates the number of switches between steering to the right and steering to the left for each of the plurality of parking space candidates determined by candidate determiner 61.

Moving distance calculator 62e calculates a moving distance from a point passing through the parking lot entrance by the vehicle to the parking space, for example, by receiving the moving distance computed by moving distance computer 52 illustrated in FIG. 2 and the vehicle position information.

Moving route calculator 62f estimates a moving route of the subject vehicle and a moving route of a moving object (vehicle, person, etc.) around the subject vehicle. The moving route may include a moving route when the vehicle parks, a moving route when the vehicle exits, a moving route of a person, and the like. For the estimation of the moving route, for example, an image captured by each of cameras 11-14, vehicle information handled by the subject vehicle, information transmitted from the external device 20, and/or the like can be used. The vehicle information handled by the subject vehicle may include, for example, information on a steering amount of a steering wheel, a position of shift lever 8, and/or the like. The information transmitted from the external device 20 may include, for example, information delivered from the management server, vehicle information transmitted from another vehicle, and/or the like.

The information delivered from the management server may include, for example, an image captured by a camera installed in the parking lot, movement detection information detected by a motion sensor installed in the parking lot, and/or the like. If a communication device is built in these devices, moving route calculator 62f can directly receive and use the information delivered from these devices. The vehicle information transmitted from the other vehicle may include, for example, information on a state of an ACC switch, a steering amount of a steering wheel, a brake depression amount, an accelerator depression amount, a position of shift lever 8, and/or the like.

Moving route calculator 62f identifies a position of another vehicle (hereinafter, it may be referred to as another (the other) vehicle X) existing around the subject vehicle, for example, by using the image captured by the camera installed in the parking lot, the images captured by cameras 11-14 of the subject vehicle, and/or the like. At this time, it can be identified whether the other vehicle X exists in the parking space or in a guide path (driving lane) of the parking lot by collating position information of the other vehicle X with facility information of the parking lot. In this way, it is possible to determine whether the other vehicle X is parking or moving in the parking lot. It should be noted that the other vehicle X is an example of a moving object, a second vehicle, a third vehicle, and a fourth vehicle according to the present disclosure. Then, when the position of the shift lever of the other vehicle X is shifted from the parking to the drive while the brake pedal of the other vehicle X is depressed, moving route calculator 62f can estimate an exit route of the other vehicle X immediately before the start of the exiting based on the steering amount of the steering wheel of the other vehicle X even if the accelerator of the other vehicle X is not depressed.

Further, when the other vehicle X starts to exit the parking space, moving route calculator 62f can estimate the exit route of the other vehicle X based on the steering amount of the steering wheel of the other vehicle X. It should be noted that when the other vehicle X starts to exit the parking space, moving route calculator 62f can calculate a traveling trajectory of the other vehicle X by recording images captured by the camera installed in the parking lot a plurality of times in time series and analyzing them. This traveling trajectory may be utilized for estimation of the exit route of the other vehicle X. In addition, for the estimation of the exit route of the other vehicle X, information on a traffic rule in the parking lot (e.g., an in-lot sign representing one-way traffic, etc.), a parking direction of the other vehicle, and/or the like may be utilized together. In this way, it is possible to estimate the exit route of the other vehicle X with high accuracy.

Further, moving route calculator 62f can estimate a moving route of a person existing around the subject vehicle similarly. Moving route calculator 62f specifies a position of the other vehicle X existing around the subject vehicle, for example, by analyzing an image captured by the camera installed in the parking lot, images captured by cameras 11-14 of the subject vehicle, and/or the like. Also, moving route calculator 62f identifies a position of a person existing around the subject vehicle by using an image captured by the camera installed in the parking lot, images captured by cameras 11-14 of the subject vehicle, and/or the like. Furthermore, moving route calculator 62f can calculate a traveling trajectory of the person by recording images captured by the camera installed in the parking lot a plurality of times in time series and analyzing them. This traveling trajectory may be utilized for estimation of the moving route of the person.

It should be noted that the estimation target of the moving route by moving route calculator 62f is not limited to a person or a vehicle, but includes a shopping cart, a non-human animal such as a dog and a cat, and the like. Here, the person, the shopping cart, and the non-human animal are an example of one or more moving objects according to the present disclosure.

Intersecting route calculator 62g, for example, determines whether the moving route of the subject vehicle and the moving route of the moving object around the subject vehicle intersect with each other. In an example, intersecting route calculator 62g determines whether or not an intersection of the moving route of the subject vehicle and the moving route of the moving object around the subject vehicle exists, and if the intersection exists, intersecting route calculator 62g calculates the moving route of the moving object around the subject vehicle as a route intersecting the moving route of the subject vehicle.

(Operations)

Figure 4:
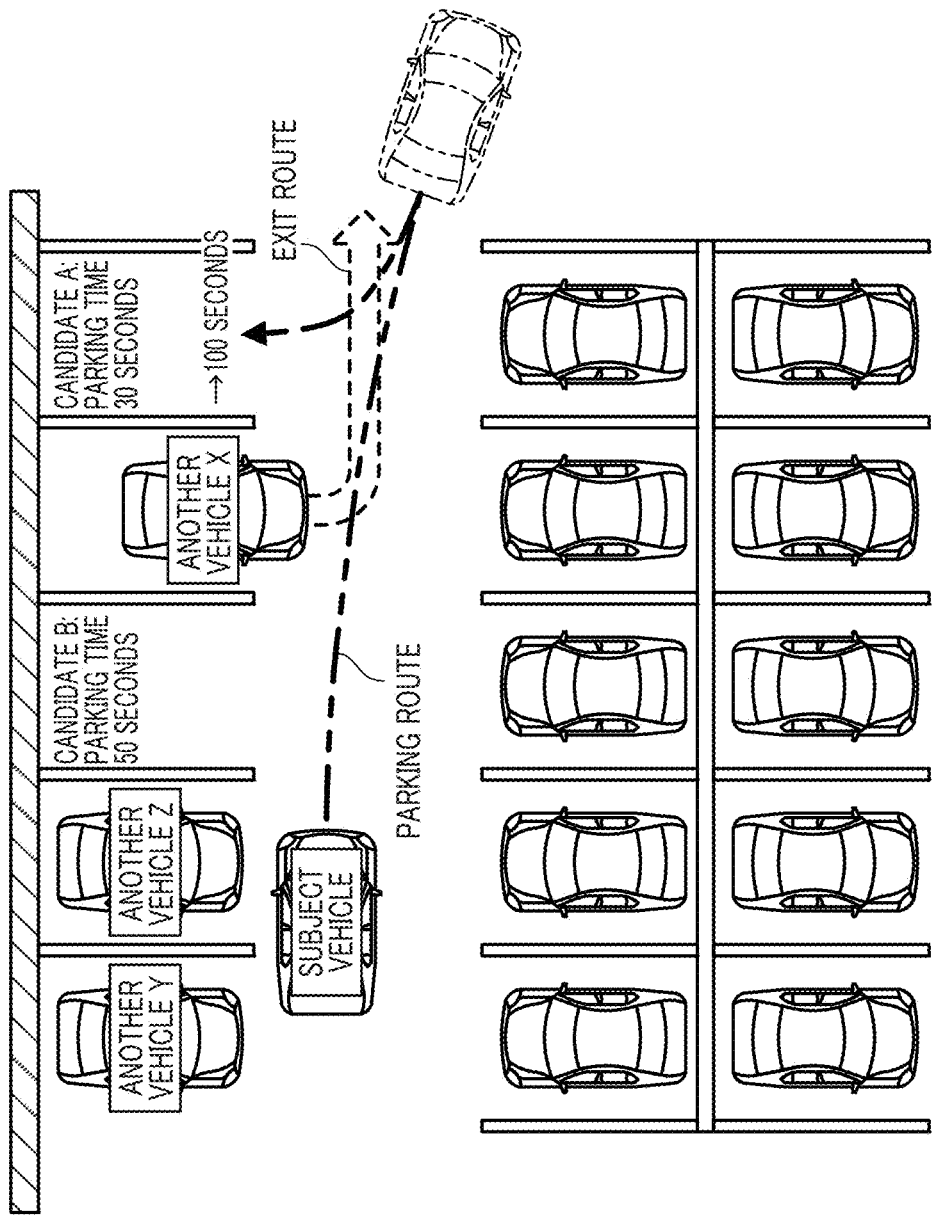
FIG. 4 is a diagram illustrating a situation where a parking route of a subject vehicle intersects with an exit route of another vehicle.
Figure 5:
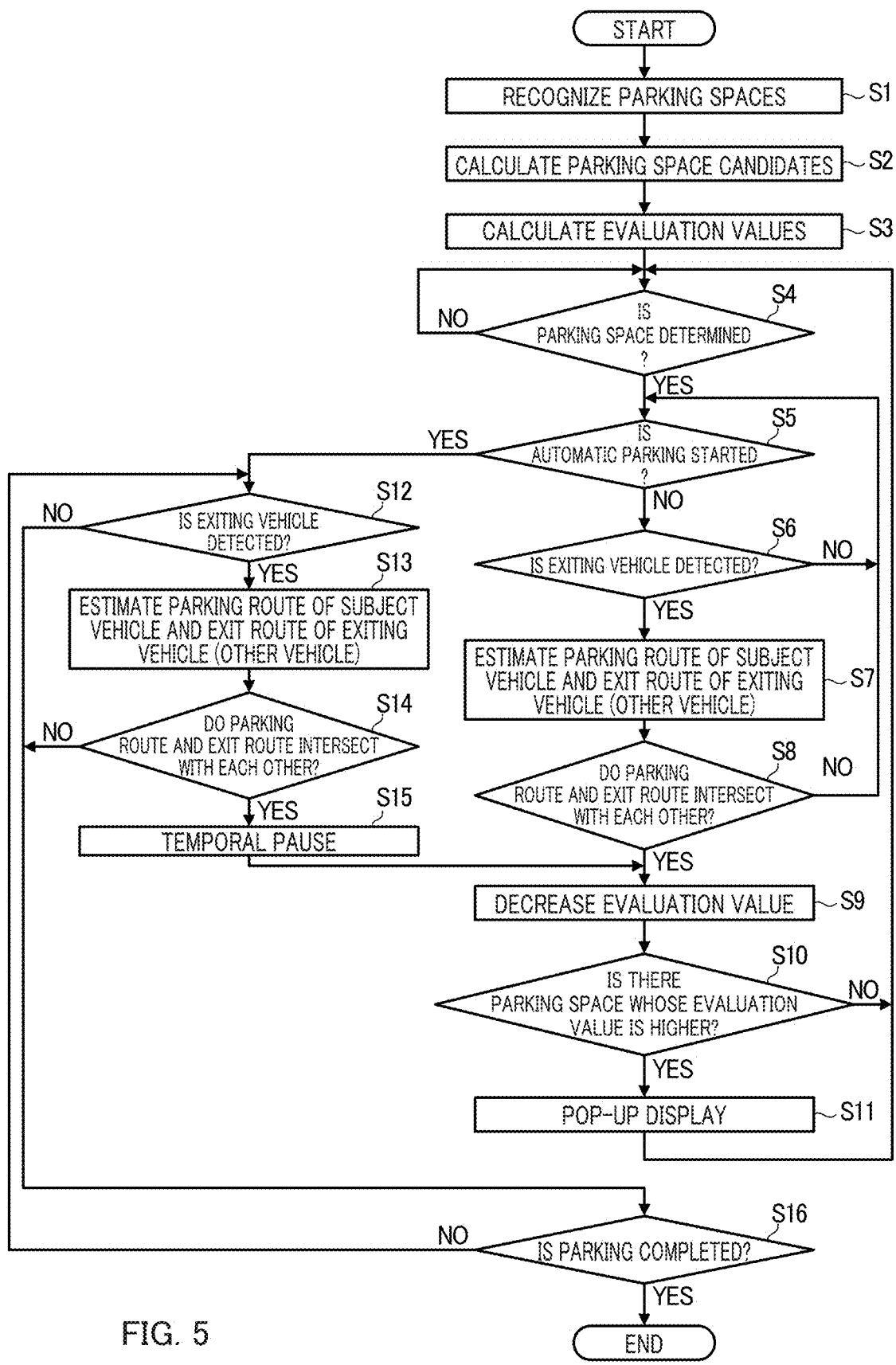
FIG. 5 is a flowchart for explaining operations of the parking assist apparatus in the situation illustrated in FIG. 4.

Next, operations of parking assist apparatus 5A will be described with reference to FIG. 4 and the like. FIG. 4 is a diagram illustrating a situation where a parking route of a subject vehicle intersects with an exit route of another vehicle. FIG. 5 is a flowchart for explaining operations of the parking assist apparatus in the situation illustrated in FIG. 4.

As illustrated in FIG. 5, parking assist apparatus 5A first recognizes, for example, a plurality of parking spaces provided in a parking lot illustrated in FIG. 4 (step S1), calculates a parking space candidate A and a parking space candidate B (step S2), and calculates respective evaluation values of the parking space candidate A and the parking space candidate B (step S3).

In the example of FIG. 4, there are two empty parking spaces in the parking lot. One empty parking space is the parking space candidate B, and another vehicle X and another vehicle Z are parking on both sides of the parking space candidate B. The other empty parking space is the parking space candidate A, and the other vehicle X is parking on one side of the parking space candidate A. On the opposite side of the other vehicle X side of the parking space candidate A, for example, there are a guide path of the parking lot, a pedestrian way, and the like. In this case, although the parking space candidate A exists at a position farther from the subject vehicle than the parking space candidate B, the subject vehicle can park in the parking space candidate A in a shorter time than in the parking space candidate B. Therefore, parking assist apparatus 5A calculates the evaluation value of the parking space candidate A as the parking time of 30 seconds and the evaluation value of the parking space candidate B as the parking time of 50 seconds. The calculation method for calculating the evaluation value will be described later.

Thereafter, parking assist apparatus 5A repeats processing of step S4 until the driver determines a parking space candidate (NO in step S4). If the parking space candidate is determined (YES in step S4), parking assist apparatus 5A performs processing of step S5.

In step S5, parking assist apparatus 5A determines that start of automatic parking is indicated, as a trigger that for example, an automatic parking mode is selected by the driver. When the start of the automatic parking is indicated (YES in step S5), parking assist apparatus 5A performs processing of step S12. When the automatic parking is not started (NO in step S5), parking assist apparatus 5A performs processing of step S6.

In step S6, parking assist apparatus 5A determines whether or not an exiting vehicle is detected. When the exiting vehicle is not detected (NO in step S6), parking assist apparatus 5A repeats processing of step S5 and subsequent steps. When the exiting vehicle is detected (YES in step S6), parking assist apparatus 5A performs processing of step S7. Here, the exiting vehicle is an example of a second vehicle according to the present disclosure.

In step S7, parking assist apparatus 5A estimates a parking route of the subject vehicle and an exit route of the exiting vehicle (other vehicle).

In step S8, parking assist apparatus 5A determines whether or not the exit route intersects with the parking route. When the exit route does not intersect with the parking route (NO in step S8), parking assist apparatus 5A repeats processing of step S5 and subsequent steps. On the other hand, when the exit route intersects with the parking route (YES in step S8), parking assist apparatus 5A performs processing of step S9.

In step S9, parking assist apparatus 5A performs processing of decreasing the evaluation value for the parking space candidate A. The reason why the evaluation value is decreased is that since it is determined that the parking route of the subject vehicle to the parking space candidate A and the exit route of the other vehicle intersect with each other, a time required for the automatic parking in the parking space candidate A until the other vehicle exits the vicinity of the parking space candidate A is estimated to be larger than the time calculated at the time of step S3, for example. Therefore, parking assist apparatus 5A recalculates the evaluation values of the parking space candidates considering the evaluation criterion of the driver. As a result, the parking time, which is the evaluation value of the parking space candidate A, is changed, for example, from "30 seconds" to "100 seconds." Then, the changed parking time of the parking space candidate A is displayed on touch panel 18.

In step S10, parking assist apparatus 5A determines whether there is a parking space candidate whose evaluation value is higher than the evaluation value changed in step S9. When there is no parking space candidate whose evaluation value is higher (NO in step S10), parking assist apparatus 5A repeats processing of step S4 and subsequent steps. On the other hand, when there is a parking space candidate whose evaluation value is higher (YES in step S10), parking assist apparatus 5A performs processing of step S11. For example, referring to FIG. 4, the parking time "50 seconds" which is one of the evaluation values of the parking space candidate B is shorter than the parking time "100 seconds" which is one of the changed evaluation values in step S9 of the parking space candidate A. Accordingly, parking assist apparatus 5A determines that there is a parking space candidate whose evaluation value is higher than that of the parking space candidate A, and performs the processing of step S11.

In step S11, parking assist apparatus 5A performs pop-up display for causing the driver to reselect in which of the parking space candidate A and the parking space candidate B the subject vehicle parks, and then repeats processing of step S4 and subsequent steps.

In step S12, parking assist apparatus 5A determines whether or not an exiting vehicle is detected in the same manner as in step S6. When the exiting vehicle is note detected (NO in step S12), parking assist apparatus 5A performs processing of step S16. On the other hand, when the exiting vehicle is detected (YES in step S12), parking assist apparatus 5A proceeds to step S13.

Thereafter, in step S13, parking assist apparatus 5A estimates moving routes of the subject vehicle and the exiting vehicle (other vehicle), and performs processing of step S14.

In step S14, parking assist apparatus 5A determines whether or not the exit route of the exiting vehicle intersects with the parking route of the subject vehicle. When the exit route does not intersect with the parking route (NO in step S14), parking assist apparatus 5A performs processing of step S16. When the exit route intersects with the parking route (YES in step S14), parking assist apparatus 5A performs temporally pausing the subject vehicle (step S15), and performs processes of step S9 and subsequent steps.

In step S16, processing of step S12 and subsequent steps is repeated until the automatic parking is completed (No in step S16). When the automatic parking is completed (YES in step S16), parking assist apparatus 5A ends the series of processing.

Effect

As described above, according to parking assist apparatus 5A, since the evaluation value of the parking space candidate can be changed considering not only the evaluation criterion of the driver but also the movement of the moving object around the subject vehicle, it can be understood that parking in the parking space candidate B can shorten the parking time as compared with parking in the parking space candidate A. Therefore, even if the other vehicle X exists in the vicinity of the parking space candidate A, it is possible to actively select the other parking space candidate B, so that it is possible to prevent the parking time of the subject vehicle from being greatly extended. Further, even if there is a following vehicle following the subject vehicle, etc., an impact on parking of the following vehicle can be reduced, thereby realizing the smooth traffic of the parking lot.

Further, according to parking assist apparatus 5A, since the updated evaluation value can be displayed on the screen depending on the state of the moving object around the subject vehicle, the driver can select whether to park the vehicle in the parking space candidate B prioritizing the parking time or park the vehicle in the parking space candidate A without using the parking space candidate B in which it is easy for the following vehicle to park, while referring to the updated evaluation value. Therefore, options of the parking space candidates are expanded, and the smooth traffic of the parking lot can be realized while suppressing an increase in stress due to waiting for the exiting of the other vehicle.

2. OTHER EXAMPLES

Contents of four types of other examples according to the present embodiment, specifically, "another example 1" to "another example 4" will be described below.

Another Example 1

Figure 6:
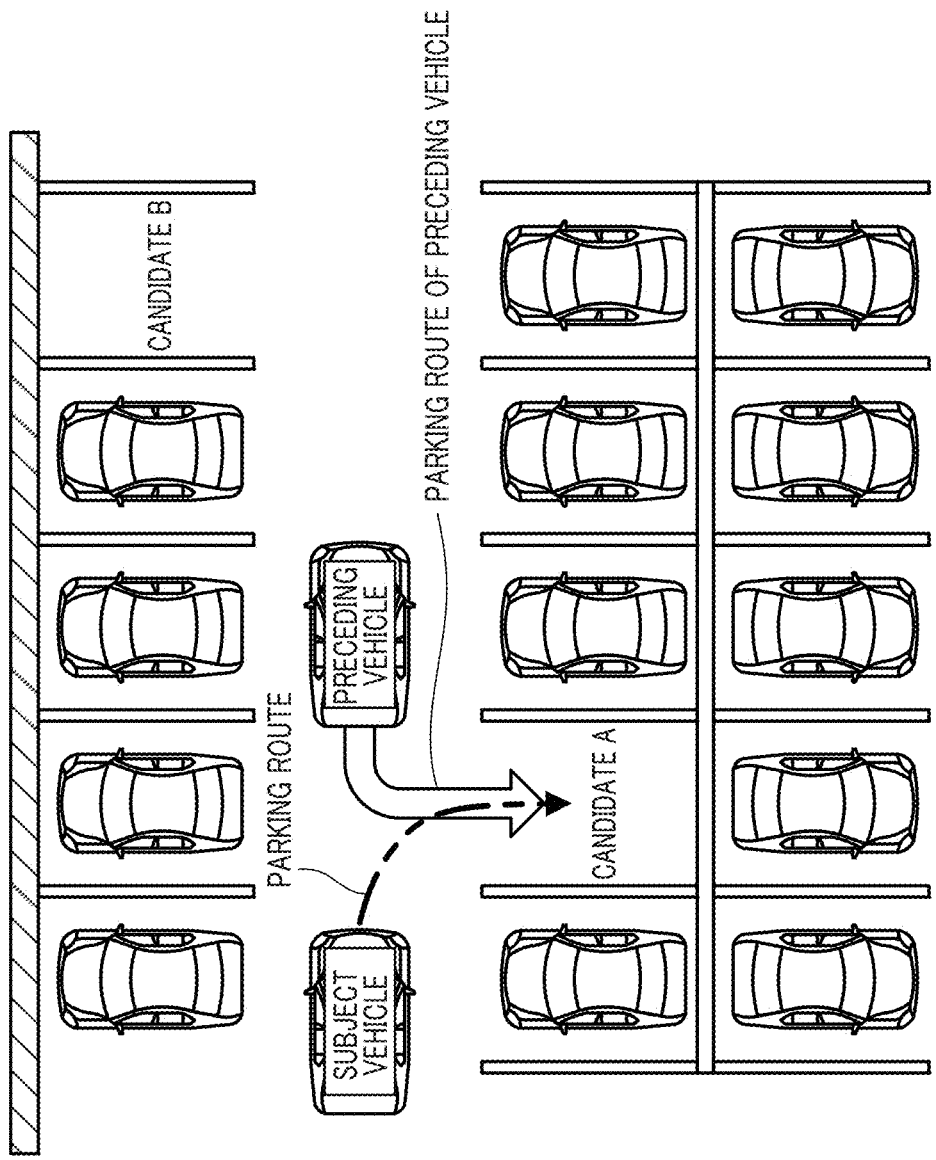
FIG. 6 is a diagram illustrating a situation where a parking route of a subject vehicle intersects with a parking route of a preceding vehicle.

First, another example 1 will be described with reference to FIG. 6. FIG. 6 is a diagram illustrating a situation where a parking route of a subject vehicle intersects with a parking route of a preceding vehicle. In FIG. 6, the parking route of the subject vehicle to the parking space candidate A intersects with the parking route of the preceding vehicle preceding to the subject vehicle by the preceding vehicle parking in the parking space candidate A. Here, the preceding vehicle is an example of a third vehicle according to the present disclosure. The preceding vehicle may be a vehicle located closest to the subject vehicle of vehicles driving in front of the subject vehicle in a traveling direction of the subject vehicle. However, without limitation, the preceding vehicle may be another vehicle located in front of the vehicle located closest to the subject vehicle of the vehicles driving in front of the subject vehicle in the traveling direction of the subject vehicle.

In this case, parking assist apparatus 5A estimates the parking route of the preceding vehicle (other vehicle) in the following manner. Parking assist apparatus 5A can identify a position of the preceding vehicle, for example, by using an image captured by a camera installed in a parking lot, images of cameras 11-14 of the subject vehicle, and/or the like. Then, when a position of shift lever 8 of the preceding vehicle is shifted from the drive to the reverse while a brake pedal of the preceding vehicle is depressed, the parking route of the preceding vehicle to the parking space candidate A can be estimated based on a steering amount of a steering wheel of the preceding vehicle even if an accelerator of the preceding vehicle is not depressed.

It should be noted that the estimation method for estimating the parking route of the preceding vehicle (other vehicle) is not limited to this, but parking assist apparatus 5A, for example, when the preceding vehicle starts to park, can calculate a traveling trajectory of the preceding vehicle by recording images captured by the camera installed in the parking lot a plurality of times in time series and analyzing them. This traveling trajectory may be utilized for the estimation of the parking route of the preceding vehicle.

Next, parking assist apparatus 5A determines whether or not the estimated parking routes of the subject vehicle and the preceding vehicle intersect with each other. When they intersect with each other, a parking space candidate is calculated again since parking in the parking space candidate A is likely to be difficult. Parking assist apparatus 5A excludes the parking space candidate A from the calculated parking space candidates, and causes a screen of touch panel 18 to display the parking space candidate B. It should be noted that parking assist apparatus 5A may cause a recommendation mark or the like indicating that the parking space candidate B is a recommended parking space candidate along with the parking space candidate B to be displayed while displaying the parking space candidate B.

Another Example 2

Figure 7:
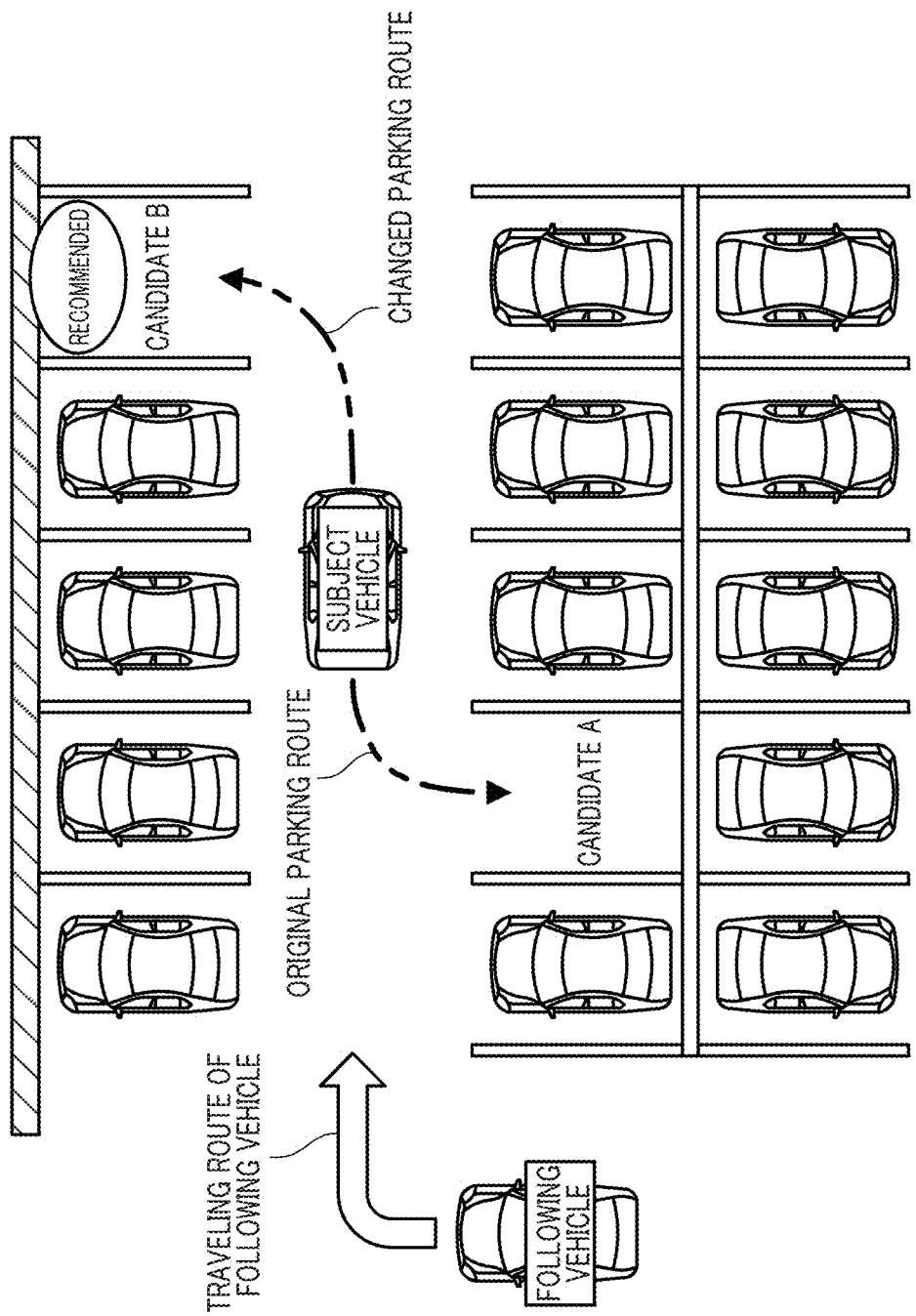
FIG. 7 is a diagram illustrating a situation where a following vehicle exists.

Next, another example 2 will be described with reference to FIG. 7. FIG. 7 is a diagram illustrating a situation where a following vehicle exists. In FIG. 7, although it is unclear whether or not the following vehicle following the subject vehicle parks in the parking space candidate A, there is another parking space candidate where parking of the subject vehicle is allowed. Here, the following vehicle is an example of a fourth vehicle according to the present disclosure. The following vehicle may be a vehicle located closest to the subject vehicle of vehicles driving behind the subject vehicle in a traveling direction of the subject vehicle. However, without limitation, the following vehicle may be another vehicle located behind of the vehicle located closest to the subject vehicle of the vehicles driving behind the subject vehicle in the traveling direction of the subject vehicle.

In this case, when detecting the following vehicle, parking assist apparatus 5A causes automatic parking in the parking space candidate A existing behind the subject vehicle to be interrupted, and causes a recommendation mark or the like indicating that the parking space candidate B is a recommended parking space candidate along with the parking space candidate B to be displayed. It is assumed that even in this case, some drivers desire parking in the parking space candidate A. Therefore, parking assist apparatus 5A may continue to cause the subject vehicle to automatically park in the parking space candidate A, and cause the recommendation mark along with the parking space candidate B to be displayed. Alternatively, depending on progress of the parking, parking assist apparatus 5A may continue to cause the subject vehicle to automatically park in the parking space candidate A.

In this way, parking assist apparatus 5A can change the recommended parking space candidate considering the movement of the moving object around the subject vehicle. This allows the driver to actively select the other parking space candidate B where parking of the subject vehicle is allowed even immediately before or after starting the automatic parking in the parking space candidate A. Therefore, it is possible to prevent the parking time of the subject vehicle from being greatly extended. In addition, an impact of the subject vehicle on the parking of the following vehicle can be reduced, and the smooth traffic of the parking lot can be realized.

Another Example 3

Figure 8:
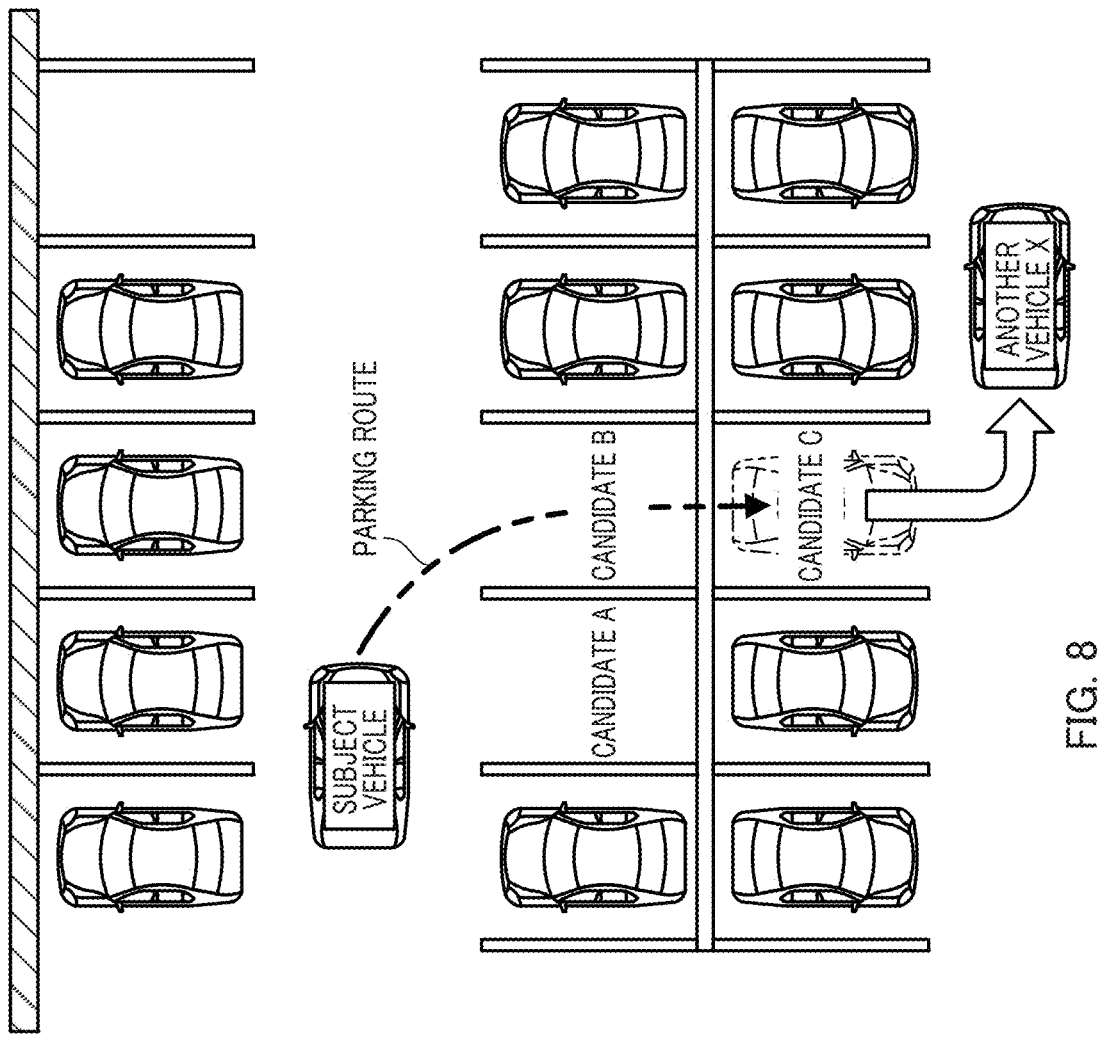
FIG. 8 is a diagram illustrating a situation where a subject vehicle parks where another vehicle had parked along another lane when the other vehicle exits.

Next, another example 3 will be described with reference to FIG. 8. FIG. 8 is a diagram illustrating a situation where a subject vehicle parks where another vehicle had parked along another lane when the other vehicle exits. In FIG. 8, a parking space candidate C where forward parking of the subject vehicle is allowed is illustrated. The parking space candidate C is one of a plurality of parking spaces provided along a lane different from a lane (driving lane) in which the subject vehicle is currently driving. As a result of another vehicle X exiting the parking space candidate C where the other vehicle X had parked, the parking space candidate C becomes a parking space candidate of the subject vehicle.

In this case, parking assist apparatus 5A detects the exiting vehicle (other vehicle X) in the other lane, recalculates the parking space candidates, and further recalculates the evaluation values of the parking space candidates to cause display panel 18 to display a result of the recalculation. The evaluation values displayed at this time include, for example, the parking time "10 seconds" of the parking space candidate C, the parking time "30 seconds" of the parking space candidate B, and the like. When the parking space candidate C is selected and automatic parking is started after such display is made, parking assist apparatus 5A can cause the subject vehicle to park in the parking space candidate C forward.

In this way, parking assist apparatus 5A can change the evaluation value of the parking space candidate considering the movement of the moving object around the subject vehicle, so that parking assist apparatus 5A can cause the subject vehicle to park in the parking space candidate along the other lane where forward parking of the subject vehicle is allowed without a vehicle stopper even immediately before or after starting the automatic parking. Therefore, even if the following vehicle exists, an impact on the parking of the following vehicle can be reduced, and the smooth traffic of the parking lot can be realized.

In addition, parking assist apparatus 5A can update the evaluation value for each of the parking space candidates considering the priorities while considering the movement of the moving object around the subject vehicle. Therefore, depending on the driver's preference, it is also possible to cause the subject vehicle to preferentially park in the parking space candidate along the current driving lane by reducing the priority of the other lane to increase the priority of the current driving lane, even if there is a parking space candidate along the other lane.

Further, when there are two adjacent parking space candidates A and B along the current driving lane, there is a higher possibility that the subject vehicle can easily exit compared to the case where the subject vehicle parks in the parking space candidate C. Therefore, when there are two or more adjacent parking space candidates, parking assist apparatus 5A may be configured to be able to set the priorities of these parking space candidates to be higher than the priorities of the parking space candidates along other lanes.

In this way, for each of the parking space candidates along the current driving lane and other lanes, by changing the evaluation value while considering the movement of the moving object around the subject vehicle, it is possible to significantly shorten the parking time of the subject vehicle, to reduce an impact on the parking of the following vehicle, and to realize the much smoother traffic of the parking lot.

Another Example 4

Figure 9:
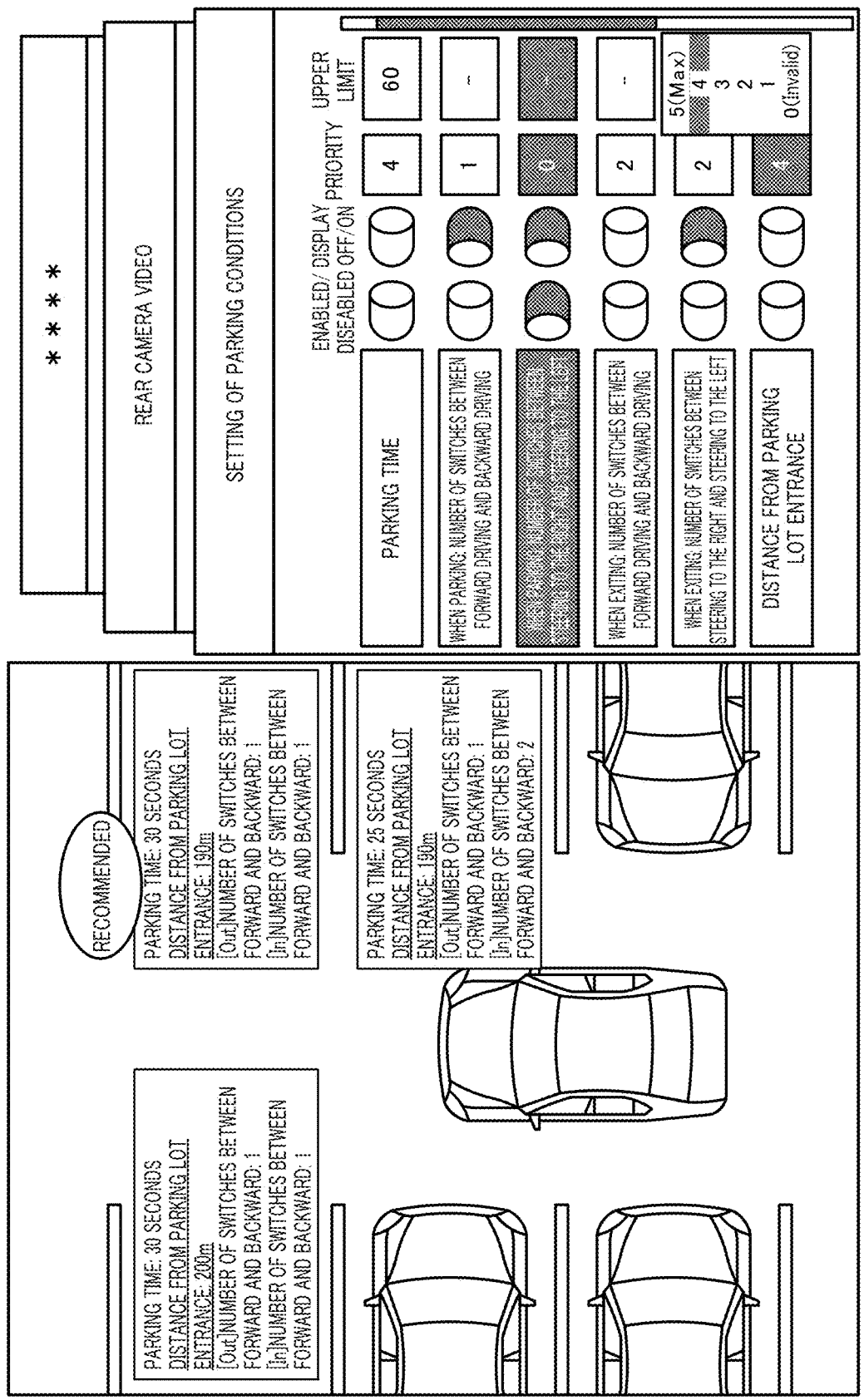

Next, another example 4 will be described with reference to FIG. 9. FIG. 9 is a diagram illustrating an example of a setting screen for setting an evaluation criterion of a driver and the like. On the right side of FIG. 9, a setting screen for setting parking conditions is illustrated. The parking conditions may include an evaluation criterion, a selection condition, a priority, and/or the like. On the setting screen for setting the parking conditions, a switch for enabling or disabling a plurality of evaluation criteria, a switch for displaying or hiding an evaluation criterion on a screen, a priority setting screen (pull-down menu, numeric keypad input, etc.), an upper limit setting screen (pull-down menu, numeric keypad input, etc.), and the like are displayed.

As examples of the evaluation criterion, the parking time, the number of switches between steering to the right and steering to the left when parking or exiting, the number of switches between forward driving and backward driving when parking or exiting, the distance from the parking lot entrance to the parking space, and the like are displayed. Additionally or alternatively, the direction of parking and/or the like may be displayed as an evaluation criterion.

The priority may be, for example, 5, 4, 3, 2, 1, 0 (invalid), or the like, or high, mid, low, none (invalid), or the like. For example, the priority of the parking time may be set to 5, the priority of the number of switches between forward driving and backward driving when parking may be set to 1, the priority of the number of switches between steering to the right and steering to the left when parking may be set to 0, the number of switches between forward driving and backward driving when exiting may be set to 2, the priority of the number of switches between steering to the right and steering to the left when exiting may be set to 2, the priority of the distance from the parking lot entrance to the parking space candidate may be set to 4, and so on.

Based on these priorities set by the driver, parking assist apparatus 5A calculates coefficients of the respective evaluation criteria according to the following equation 1:

[1]
$$\text{Coefficient} = \frac{P}{P_1 + P_2 + P_3 + \ldots + P_N} \quad \text{(Equation 1)}$$

P is the priority of the target evaluation criterion, and $P_1$-$P_N$ (N is an integer greater than or equal to 1) is the priority of each evaluation criterion. For the above priorities, the coefficient of the parking time is calculated as $5/(5+1+0+2+2+4) \approx 0.35$.

Further, parking assist apparatus 5A calculates the evaluation value for each of the parking space candidates as a weighted sum of the evaluation values of the respective evaluation criteria according to the following equation 2:

[2]
$$\text{Evaluation Value} = \Sigma((\text{Evaluation Value of Each Evaluation Criterion}) \times (\text{Coefficient of Each Evaluation Criterion})) \quad \text{(Equation 2)}$$

On the left side of FIG. 9, the evaluation values and the like of the respective parking space candidates are displayed. In this way, the evaluation values of the respective parking space candidates calculated based on the contents set on the setting screen for setting the parking conditions are displayed with being composed with actual images of the parking space candidates. This screen enables presenting, to the driver, the evaluation values reflecting the states of the other vehicles (the parking vehicle(s), the preceding vehicle(s), and the succeeding vehicle(s)) and the like.

It should be noted that parking assist apparatus 5A may be configured to store the parking date and time and the content of the set evaluation criterion in association with, for example, the position information of the parking lot. For example, this can be realized by setting, in parking assist apparatus 5A, table information in which the parking date and time and the evaluation criterion are associated with the position information of the parking lot.

According to this configuration, for example, when a driver parks a vehicle in a parking lot of a facility where the driver frequently visits, the set evaluation criterion or the like can be read and used, so that it is possible to save labor for resetting the evaluation criterion. In this case, a configuration may be adopted in which it is possible to select whether the recorded evaluation criterion or the like is read and used every time the driver drives or is read and used at an arbitrary timing of the driver. In addition, the evaluation criterion to be enabled, the priority, and the upper limit may be stored in association with each of a plurality of parking lots. As a result, it is possible to save time and labor to reset the evaluation criterion for each of the different parking lots.

2. MODIFICATIONS

While various embodiments have been described above referring to the drawings, it is needless to say that the present disclosure is not limited to such examples. It can be understood that it is obvious to those skilled in the art that various modifications or variations may be arrived at within the scope set forth in the claims, and that they also fall within the technical scope of the present disclosure. In addition, the components in the above embodiments may be arbitrarily combined without departing from the spirit of the disclosure.

Modifications of the present embodiment will be described below. For example, parking assist apparatus 5A may be configured to store user identification information (e.g., facial image) identifying a driver in association with the above-described evaluation criterion to be enabled, the priority, and the upper limit. For example, this can be realized by setting, in parking assist apparatus 5A, table information in which the evaluation criterion or the like is associated with the user identification information.

Further, the parking condition may involve an evaluation criterion for a congestion level of a parking lot. For example, parking assist apparatus 5A can grasp a congestion level of a three-dimensional parking lot of a department store where the driver frequently visits by using information indicating a congestion level for each floor, information indicating a congestion level for each parking block in each floor, and/or the like, which are delivered from the three-dimensional parking lot. It is desirable to add the congestion level to the setting screen for setting the parking conditions as an evaluation criterion, and to further set the priority of the congestion level and the upper limit of the congestion level. For example, if the congestion level on each of the first and third floors of the three-dimensional parking lot is around 90%, and the congestion level on the second floor is 50%, it is possible to guide a vehicle to the floor with a low congestion level by increasing the priority of the congestion level and setting the upper limit to 80% or the like. When the congestion levels of blocks A and B on the second floor are different from each other, an evaluation criterion for the congestion level for each block may be set. For example, when the congestion level of the block A near the entrance of the second floor is 50% and the congestion level of the block B near the exit of the second floor is 20%, the block closer to the entrance of the floor can be displayed as a recommended block, for example, even if the congestion level thereof is high, depending on the preference of the driver.

Further, parking assist apparatus 5A may be configured to recommend automatic parking in order to reduce the burden on the driver at the time of parking when there is a parking space candidate with a high evaluation value, and not to recommend automatic driving for other parking space candidates. This enables realizing the smooth traffic of the parking lot while reducing the load on the driver at the time of parking.

Also, parking assist apparatus 5A may be configured to be able to select an automatic exit mode based on the evaluation criterion set by the driver or the like. For example, a turning radius of the vehicle when forward driving is larger than a turning radius of the vehicle when backward driving, so that the driving burden due to the manual operation is increased when the vehicle exits forward. Then, when the vehicle exits a parking space where a tire steering angle (steering angle) is increased, the burden on the driver can be reduced by enabling automatically selecting the automatic exit mode.

In addition, parking assist apparatus 5A may be configured to cause the screen to display, at the time of parking, parking space candidates that the vehicle can exit even if a steering angle is small, as recommended parking space candidates. When the vehicle exits a parking space forward, a turning radius of the vehicle becomes large, so that a vehicle tip is likely to contact with an obstacle or the like, which increases the burden on the driver. Then, it is possible to cause the vehicle to park so that a parking space candidate where the burden on the driver at the time of exiting forward is large is avoided, for example, by adding an evaluation criterion of a steering angle and enabling setting a priority and a upper limit (such as a rotational frequency of a steering wheel) corresponding thereto.

Although a parking space candidate with a high evaluation value may be a parking space candidate which is desirable for a user at the time of parking, it may be a parking space which is undesirable for the user at the time of exiting. For example, while a small vehicle is parking in an adjacent parking space at the time of parking, a large vehicle may be parking at the time of exiting. In this case, since a gap between the large vehicle and the subject vehicle is narrower, it is likely to be difficult to exit, especially when exiting by the manual operation. In addition, the number of switches between steering to the right and steering to the left when exiting may be increased more than the number of switches between steering to the right and steering to the left when parking due to a traveling direction regulation in a parking lot. Then, it is possible to preferentially select a parking space candidate where the number of switches between steering to the right and steering to the left when exiting or the like is small by providing an evaluation criterion at the time of exiting in addition to an evaluation criterion at the time of parking, as the evaluation criterion of the driver. Therefore, even if the large vehicle parks in the adjacent parking space, it is possible to avoid a situation where it is difficult for the subject vehicle to exit.

Parking assist apparatus 5A can also select a parking space candidate, select a recommended parking space candidate, change an evaluation value, and so on, considering a movement of a person and/or the like even if the person exists around the subject vehicle in addition to or instead of a vehicle around the subject vehicle. For example, even if a plurality of persons cross the parking route of the subject vehicle illustrated in FIG. 4 continuously, a recommended parking space candidate, an updated evaluation value, and the like can be provided to the driver by recalculating the evaluation value.

While the specific examples of the present disclosure have been described in detail above, these are merely illustrative and do not limit the scope of the claims. The technique described in the claims includes various modifications and variations of the specific examples illustrated above.

For example, the following aspects are also understood to fall within the scope of the present disclosure.

(1) A parking assist apparatus may be configured to comprise: a display controller that causes a display to display a first parking space candidate set including one or more parking spaces identified from among a plurality of parking spaces based on an evaluation criterion of a driver and information indicating states of movements of one or more moving objects around a first vehicle, and that causes the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed; and a driving controller that controls automatic driving of the first vehicle so that the first vehicle moves to a first parking space that is included in the first parking space candidate set and selected as the scheduled parking space. It should be noted that an example of the first vehicle may be the subject vehicle described above.

(2) The display controller may further cause the display to display, for each of all the parking spaces included in the first parking space candidate set, evaluation information specified for the parking space based on the evaluation criterion of the driver and the information indicating the states of the movements of the one or more moving objects in association with the parking space. It should be noted that an example of the evaluation information may be the evaluation value described above.

(3) The driving controller may control the automatic driving of the first vehicle based on a moving route of the first vehicle to the first parking space and a moving route of one of the one or more moving objects estimated based on the information indicating the states of the movements of the one or more moving objects.

(4) When it is determined that the moving route of the first vehicle to the first parking space and the moving route of the moving object intersect with each other, the driving controller may control the automatic driving of the first vehicle so that the first vehicle moves to a second parking space that is included in the first parking space candidate set and different from the first parking space.

(5) When it is determined that the moving route of the first vehicle to the first parking space and the moving route of the moving object do not intersect with each other, the driving controller may control the automatic driving of the first vehicle so that the first vehicle moves to the first parking space.

(6) When it is determined that the moving route of the first vehicle to the first parking space and the moving route of the moving object intersect with each other, and when a second parking space candidate set including one or more parking spaces is newly identified from among the plurality of parking spaces based on the evaluation criterion of the driver and the information indicating the states of the movements of the one or more moving objects, the display controller may cause the display not to display the first parking space candidate set, and cause the display to display the second parking space candidate set in a manner that allows the driver to select any of all the parking spaces included in the second parking space candidate set as a new scheduled parking space for the first vehicle.

(7) When a third parking space included in the second parking space candidate set is selected as the new scheduled parking space, the driving controller may control the automatic driving of the first vehicle so that the first vehicle moves to the third parking space.

(8) When the moving route of the first vehicle to the first parking space and the moving route of the moving object intersect with each other, the display controller may change a displayed content on the display so that for each of all the parking spaces included in the second parking space candidate set, evaluation information newly specified for the parking space based on the evaluation criterion of the driver and the information indicating the states of the movements of the one or more moving objects is displayed in association with the parking space.

(9) One of the one or more moving objects may be a second vehicle parking in or exiting any of the plurality of parking spaces.

(10) One of the one or more moving objects may be a third vehicle driving in front of the first vehicle in a path in which the first vehicle is driving, and when the third vehicle is estimated to park in any of the plurality of parking spaces, the driving controller may control the automatic driving of the first vehicle based on a moving route of the third vehicle to the parking space estimated based on the information indicating the state of the movement of the third vehicle and a moving route of the first vehicle to the first parking space. It should be noted that an example of the third vehicle may be the preceding vehicle described above. The preceding vehicle (third vehicle) may be a vehicle located closest to the subject vehicle of vehicles driving in front of the subject vehicle in a traveling direction of the subject vehicle, or it may be another vehicle located in front of the vehicle located closest to the subject vehicle.

(11) When the parking space in which the third vehicle is estimated to park and the first parking space are the same, the driving controller may control the automatic driving of the first vehicle so that the first vehicle moves to a fourth parking space different from the first parking space of the plurality of parking spaces.

(12) One of the one or more moving objects may be a third vehicle driving in front of the first vehicle in a path in which the first vehicle is driving, and when the third vehicle is estimated to park in any of the plurality of parking spaces, and the estimated parking space and the first parking space are the same, and when a third parking space candidate set including one or more parking spaces is newly identified from among the plurality of parking spaces based on the evaluation criterion of the driver and the information indicating the states of the movements of the one or more moving objects, the display controller may cause the display not to display the first parking space candidate set, and cause the display to display the third parking space candidate set in a manner that allows the driver to select any of all the parking spaces included in the third parking space candidate set as a new scheduled parking space for the first vehicle.

(13) One of the one or more moving objects may be a fourth vehicle driving behind the first vehicle in a path in which the first vehicle is driving, and when it is detected that the fourth vehicle exists or when it is detected that a distance between the first vehicle and the fourth vehicle is less than a predetermined distance, the display controller may cause the display to display inquiry information for inquiring of the driver whether or not to change the scheduled parking space from the first parking space to a fifth parking space of the plurality of parking spaces. It should be noted that an example of the fourth vehicle may be the following vehicle described above. The following vehicle (fourth vehicle) may be a vehicle located closest to the subject vehicle of vehicles driving behind the subject vehicle in a traveling direction of the subject vehicle, or it may be another vehicle located behind the vehicle located closest to the subject vehicle.

(14) When instruction information indicating an instruction to change the scheduled parking space from the first parking space to the fifth parking space is inputted by the driver after the inquiry information is displayed on the display, the driving controller may control the automatic driving of the first vehicle so that the first vehicle moves to the fifth parking space.

(15) When it is not detected that the fourth vehicle exists or when it is detected that the distance between the first vehicle and the fourth vehicle is greater than or equal to the predetermined distance, the driving controller may control the automatic driving of the first vehicle so that the first vehicle moves to the first parking space.

(16) One of the one or more moving objects may be a fourth vehicle driving behind the first vehicle in a path in which the first vehicle is driving, and when it is detected that the fourth vehicle exists or when it is detected that a distance between the first vehicle and the fourth vehicle is less than a predetermined distance, and when a fourth parking space candidate set including one or more parking spaces is newly identified from among the plurality of parking spaces based on the evaluation criterion of the driver and the information indicating the states of the movements of the one or more moving objects, the display controller may cause the display not to display the first parking space candidate set, and cause the display to display the fourth parking space candidate set in a manner that allows the driver to select any of all the parking spaces included in the fourth parking space candidate set as a new scheduled parking space for the first vehicle.

(17) When predetermined instruction information for moving the first vehicle is inputted after the first vehicle parks in any of the plurality of parking spaces, the driving controller may cause the first vehicle to automatically exit the parking space based on the evaluation criterion of the driver. The instruction information may be, for example, information indicating that a GUI (Graphical User Interface) (such as an icon) for automatic exiting has been selected, information indicating that an ignition has been turned on, or the like.

(18) The parking assist apparatus may be configured to further include: a parking space recognizer that recognizes the plurality of parking spaces; an evaluation criterion setter that sets the evaluation criterion of the driver; and a parking space candidate identifier that identifies the first parking space candidate set from among the plurality of parking spaces based on the evaluation criterion of the driver and the information indicating the states of the movements of the one or more moving objects around the first vehicle.

(19) A parking assist system may be configured to include: a display controller that causes a display to display a first parking space candidate set including one or more parking spaces identified from among a plurality of parking spaces based on an evaluation criterion of a driver and information indicating states of movements of one or more moving objects around a first vehicle, and that causes the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed; and a driving controller that controls automatic driving of the first vehicle so that the first vehicle moves to a first parking space that is included in the first parking space candidate set and selected as the scheduled parking space.

(20) A parking assist method may include: causing a display to display a first parking space candidate set including one or more parking spaces identified from among a plurality of parking spaces based on an evaluation criterion of a driver and information indicating states of movements of one or more moving objects around a first vehicle, and causing the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed; and controlling automatic driving of the first vehicle so that the first vehicle moves to a first parking space that is included in the first parking space candidate set and selected as the scheduled parking space.

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2020-052676, filed on Mar. 24, 2020, the disclosure of which including the specification, drawings and abstract is incorporated herein by reference in its entirety.

INDUSTRIAL APPLICABILITY

An aspect of the present disclosure is suitable for a parking assist apparatus and a parking assist system.

The invention claimed is:

1. A parking assist apparatus comprising:
a display controller that causes a display to display a first parking space candidate set including one or more parking spaces identified from among a plurality of parking spaces based on an evaluation criterion of a driver and information indicating states of movements of one or more moving objects around a first vehicle, and that causes the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed; and
a driving controller that controls automatic driving of the first vehicle so that the first vehicle moves to a first parking space that is included in the first parking space candidate set and selected as the scheduled parking space,
wherein the display controller further causes the display to display, for one or more of the parking spaces included in the first parking space candidate set, evaluation information in association with the parking space, the evaluation information being specified for the parking space based on both of the evaluation criterion of the driver and the information indicating the states of the movements of the one or more moving objects.

2. The parking assist apparatus according to claim 1, wherein the driving controller controls the automatic driving of the first vehicle based on a moving route of the first vehicle to the first parking space and a moving route of one of the one or more moving objects estimated based on the information indicating the states of the movements of the one or more moving objects.

3. The parking assist apparatus according to claim 2, wherein, when it is determined that the moving route of the first vehicle to the first parking space and the moving route of the moving object intersect with each other, the driving controller controls the automatic driving of the first vehicle so that the first vehicle moves to a second parking space that is included in the first parking space candidate set and different from the first parking space.

4. The parking assist apparatus according to claim 2, wherein, when it is determined that the moving route of the first vehicle to the first parking space and the moving route of the moving object do not intersect with each other, the driving controller controls the automatic driving of the first vehicle so that the first vehicle moves to the first parking space.

5. The parking assist apparatus according to claim 2, wherein, when it is determined that the moving route of the first vehicle to the first parking space and the moving route of the moving object intersect with each other, and when a second parking space candidate set including one or more parking spaces is newly identified from among the plurality of parking spaces based on the evaluation criterion of the driver and the information indicating the states of the movements of the one or more moving objects, the display controller causes the display not to display the first parking space candidate set, and causes the display to display the second parking space candidate set in a manner that allows the driver to select any of all the parking spaces included in the second parking space candidate set as a new scheduled parking space for the first vehicle.

6. The parking assist apparatus according to claim 5, wherein, when a third parking space included in the second parking space candidate set is selected as the new scheduled parking space, the driving controller controls the automatic driving of the first vehicle so that the first vehicle moves to the third parking space.

7. The parking assist apparatus according to claim 5, wherein, when the moving route of the first vehicle to the first parking space and the moving route of the moving object intersect with each other, the display controller changes a displayed content on the display so that for each of all the parking spaces included in the second parking space candidate set, evaluation information newly specified for the parking space based on the evaluation criterion of the driver and the information indicating the states of the movements of the one or more moving objects is displayed in association with the parking space.

8. The parking assist apparatus according to claim 1, wherein one of the one or more moving objects is a second vehicle parking in or exiting any of the plurality of parking spaces.

9. The parking assist apparatus according to claim 1, wherein one of the one or more moving objects is a third vehicle driving in front of the first vehicle in a path in which the first vehicle is driving, and
when the third vehicle is estimated to park in any of the plurality of parking spaces, the driving controller controls the automatic driving of the first vehicle based on a moving route of the third vehicle to the parking space estimated based on the information indicating the state of the movement of the third vehicle and a moving route of the first vehicle to the first parking space.

10. The parking assist apparatus according to claim 9, wherein, when the parking space in which the third vehicle is estimated to park and the first parking space are the same, the driving controller controls the automatic driving of the first vehicle so that the first vehicle moves to a fourth parking space different from the first parking space of the plurality of parking spaces.

11. The parking assist apparatus according to claim 1, wherein one of the one or more moving objects is a third vehicle driving in front of the first vehicle in a path in which the first vehicle is driving, and
when the third vehicle is estimated to park in any of the plurality of parking spaces, and the estimated parking space and the first parking space are the same, and when a third parking space candidate set including one or more parking spaces is newly identified from among the plurality of parking spaces based on the evaluation criterion of the driver and the information indicating the states of the movements of the one or more moving objects, the display controller causes the display not to display the first parking space candidate set, and causes the display to display the third parking space candidate set in a manner that allows the driver to select any of all the parking spaces included in the third parking space candidate set as a new scheduled parking space for the first vehicle.

12. The parking assist apparatus according to claim 1, wherein one of the one or more moving objects is a fourth vehicle driving behind the first vehicle in a path in which the first vehicle is driving, and
when it is detected that the fourth vehicle exists or when it is detected that a distance between the first vehicle and the fourth vehicle is less than a predetermined distance, the display controller causes the display to display inquiry information for inquiring of the driver whether or not to change the scheduled parking space from the first parking space to a fifth parking space of the plurality of parking spaces.

13. The parking assist apparatus according to claim 12, wherein, when instruction information indicating an instruction to change the scheduled parking space from the first parking space to the fifth parking space is inputted by the driver after the inquiry information is displayed on the display, the driving controller controls the automatic driving of the first vehicle so that the first vehicle moves to the fifth parking space.

14. The parking assist apparatus according to claim 12, wherein, when it is not detected that the fourth vehicle exists or when it is detected that the distance between the first vehicle and the fourth vehicle is greater than or equal to the predetermined distance, the driving controller controls the automatic driving of the first vehicle so that the first vehicle moves to the first parking space.

15. The parking assist apparatus according to claim 1, wherein one of the one or more moving objects is a fourth vehicle driving behind the first vehicle in a path in which the first vehicle is driving, and
when it is detected that the fourth vehicle exists or when it is detected that a distance between the first vehicle and the fourth vehicle is less than a predetermined distance, and when a fourth parking space candidate set including one or more parking spaces is newly identified from among the plurality of parking spaces based on the evaluation criterion of the driver and the information indicating the states of the movements of the one or more moving objects, the display controller causes the display not to display the first parking space candidate set, and causes the display to display the fourth parking space candidate set in a manner that allows the driver to select any of all the parking spaces included in the fourth parking space candidate set as a new scheduled parking space for the first vehicle.

16. The parking assist apparatus according to claim 1, wherein, when predetermined instruction information for moving the first vehicle is inputted after the first vehicle parks in any of the plurality of parking spaces, the driving controller causes the first vehicle to automatically exit the parking space based on the evaluation criterion of the driver.

17. The parking assist apparatus according to claim 1, further comprising:
a parking space recognizer that recognizes the plurality of parking spaces;
an evaluation criterion setter that sets the evaluation criterion of the driver; and
a parking space candidate identifier that identifies the first parking space candidate set from among the plurality of parking spaces based on the evaluation criterion of the driver and the information indicating the states of the movements of the one or more moving objects around the first vehicle.

18. A parking assist system comprising:
a display controller that causes a display to display a first parking space candidate set including one or more parking spaces identified from among a plurality of parking spaces based on an evaluation criterion of a driver and information indicating states of movements of one or more moving objects around a first vehicle, and that causes the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed; and
a driving controller that controls automatic driving of the first vehicle so that the first vehicle moves to a first parking space that is included in the first parking space candidate set and selected as the scheduled parking space, wherein
the display controller further causes the display to display, for one or more of the parking spaces included in the first parking space candidate set, evaluation information in association with the parking space, the evaluation information being specified for the parking space based on both of the evaluation criterion of the driver and the information indicating the states of the movements of the one or more moving objects.

19. A parking assist method comprising:

causing a display to display a first parking space candidate set including one or more parking spaces identified from among a plurality of parking spaces based on an evaluation criterion of a driver and information indicating states of movements of one or more moving objects around a first vehicle, and causing the display to display the first parking space candidate set in a manner that allows the driver to select any of all the parking spaces included in the first parking space candidate set as a scheduled parking space for the first vehicle, the plurality of parking spaces being a plurality of recognized parking spaces where parking of the first vehicle is allowed;

controlling automatic driving of the first vehicle so that the first vehicle moves to a first parking space that is included in the first parking space candidate set and selected as the scheduled parking space; and causing the display to display, for one or more of the parking spaces included in the first parking space candidate set, evaluation information in association with the parking space, the evaluation information being specified for the parking space based on both of the evaluation criterion of the driver and the information indicating the states of the movements of the one or more moving objects.

* * * * *